United States Patent
Kim et al.

(10) Patent No.: US 12,437,201 B2
(45) Date of Patent: Oct. 7, 2025

(54) PREDICTING OPTIMAL VALUES FOR PARAMETERS USED IN AN OPERATION OF AN IMAGE SIGNAL PROCESSOR USING MACHINE LEARNING

(71) Applicant: SAMSUNG ELECTRONICS CO., LTD., Suwon-si (KR)

(72) Inventors: Younghoon Kim, Suwon-si (KR); Sungsu Kim, Suwon-si (KR); Jungmin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 348 days.

(21) Appl. No.: 18/067,298

(22) Filed: Dec. 16, 2022

(65) Prior Publication Data

US 2023/0117343 A1   Apr. 20, 2023

Related U.S. Application Data

(63) Continuation of application No. 16/724,626, filed on Dec. 23, 2019, now abandoned.

(30) Foreign Application Priority Data

May 21, 2019   (KR) ........................ 10-2019-0059573

(51) Int. Cl.
  *G06N 3/084*   (2023.01)
  *G06N 3/044*   (2023.01)
  (Continued)

(52) U.S. Cl.
  CPC .............. *G06N 3/084* (2013.01); *G06N 3/044* (2023.01); *G06N 3/08* (2013.01); *G06T 5/50* (2013.01);
  (Continued)

(58) Field of Classification Search
  CPC .... G06T 7/97; G06T 5/50; G06T 5/70; G06T 5/92; G06T 2207/20081;
  (Continued)

(56) References Cited

U.S. PATENT DOCUMENTS 9,734,567 B2   8/2017   Zhang et al.
9,741,107 B2   8/2017   Xu et al.
(Continued)

FOREIGN PATENT DOCUMENTS

CA   3099659 A1 * 11/2019   ......... B62D 15/0215
CA   3109460 A1 *  2/2020   ........... A61B 5/0013
(Continued)

OTHER PUBLICATIONS

Office Action dated Jul. 31, 2024 in corresponding KR Application No. 10-2019-0059573.
(Continued)

*Primary Examiner* — Charlotte M Baker
(74) *Attorney, Agent, or Firm* — Morgan, Lewis & Bockius LLP

(57) ABSTRACT

A method of predicting optimal values for a plurality of parameters used in an operation of an image signal processor includes: inputting initial values for the plurality of parameters to a machine learning model having an input layer, corresponding to the plurality of parameters, and an output layer corresponding to a plurality of evaluation items extracted from a result image generated by the image signal processor; obtaining evaluation scores for the plurality of evaluation items using an output of the machine learning model; adjusting weights, applied to the plurality of parameters, based on the evaluation scores; and determining the optimal values using the adjusted weights.

17 Claims, 19 Drawing Sheets

(51) Int. Cl.
  *G06N 3/08* (2023.01)
  *G06T 5/50* (2006.01)
  *G06T 5/60* (2024.01)
  *G06T 5/70* (2024.01)
  *G06T 5/92* (2024.01)
  *G06T 7/00* (2017.01)

(52) U.S. Cl.
  CPC .................. *G06T 5/60* (2024.01); *G06T 5/70* (2024.01); *G06T 5/92* (2024.01); *G06T 7/97* (2017.01); *G06T 2207/20081* (2013.01); *G06T 2207/20084* (2013.01)

(58) Field of Classification Search
  CPC ... G06T 2207/20084; G06T 5/60; G06T 1/20; G06T 5/00; G06T 15/00; G06N 3/044; G06N 3/08; G06N 3/084; G06N 20/00; H04N 25/70; H04N 25/00
  USPC ....................................................... 382/159
  See application file for complete search history.

(56) References Cited

U.S. PATENT DOCUMENTS

| | | | |
|---|---|---|---|
| 9,826,149 B2 | 11/2017 | Chalom et al. | |
| 2002/0131652 A1 | 9/2002 | Yoda | |
| 2002/0196472 A1 | 12/2002 | Enomoto | |
| 2014/0104450 A1 | 4/2014 | Cox | |
| 2016/0110849 A1 | 4/2016 | Jain et al. | |
| 2016/0209995 A1 | 7/2016 | Jeon et al. | |
| 2016/0241791 A1 * | 8/2016 | Narayanswamy | G06T 15/00 |
| 2016/0379352 A1 | 12/2016 | Zhang et al. | |
| 2017/0070671 A1 | 3/2017 | Cho | |
| 2017/0103512 A1 | 4/2017 | Mailhe et al. | |
| 2017/0185871 A1 | 6/2017 | Zhang et al. | |
| 2018/0227557 A1 | 8/2018 | Athreya et al. | |
| 2018/0315166 A1 | 11/2018 | Noyes et al. | |
| 2019/0043209 A1 | 2/2019 | Nishimura et al. | |
| 2019/0050682 A1 | 2/2019 | Sutic et al. | |
| 2019/0108621 A1 | 4/2019 | Condorovici | |
| 2019/0138838 A1 | 5/2019 | Liu et al. | |
| 2019/0244358 A1 | 8/2019 | Shi et al. | |
| 2019/0361808 A1 | 11/2019 | Subramanian et al. | |
| 2020/0279279 A1 * | 9/2020 | Chaudhuri | G06N 5/04 |
| 2020/0372682 A1 | 11/2020 | Kim et al. | |

FOREIGN PATENT DOCUMENTS

| | | | | |
|---|---|---|---|---|
| CA | 3123025 A1 | * | 6/2020 | ............ E21B 17/02 |
| CA | 3141859 A1 | * | 10/2020 | ........... G06F 18/254 |
| CN | 102184423 A | * | 9/2011 | |
| CN | 107038698 | | 8/2017 | |
| CN | 107810505 | | 3/2018 | |
| JP | 10-283460 | | 10/1998 | |
| JP | 3997690 B2 | * | 10/2007 | ........... G11B 19/022 |
| JP | 2016-206728 | | 12/2016 | |
| KR | 10-2017-0029185 | | 3/2017 | |
| TW | 201216207 A | * | 4/2012 | ............. G03B 13/36 |

OTHER PUBLICATIONS

European Search Report dated Aug. 10, 2020 in corresponding European Application No. 20160775.1.
Nishimura, Jun et al., "Automatic ISP Image Quality Using Non-linear Optimization", 2018 IEEE, pp. 2471-2475.
Office Action dated Apr. 12, 2021 in corresponding U.S. Appl. No. 16/724,626.
Office Action dated Mar. 28, 2022 in corresponding U.S. Appl. No. 16/724,626.
Final Office Action dated Aug. 11, 2022 in corresponding U.S. Appl. No. 16/724,626.
Office Action dated Dec. 11, 2023 in corresponding CN Appln. No. 202010315993.7.

* cited by examiner

| FIRST PARAMETER | SECOND PARAMETER | THIRD PARAMETER | FOURTH PARAMETER | FIFTH PARAMETER | SIXTH PARAMETER |
|---|---|---|---|---|---|
| 0.044228663 | 0.038579834 | 0.033179612 | 0.00315716 | 5.032357315 | 0.002490043 |

PREDICTING OPTIMAL VALUES FOR PARAMETERS USED IN AN OPERATION OF AN IMAGE SIGNAL PROCESSOR USING MACHINE LEARNING

CROSS-REFERENCE TO RELATED APPLICATION(S)

This U.S. non-provisional patent application is a continuation application of U.S. patent application Ser. No. 16/724,626 filed Dec. 23, 2019, which claims the benefit of priority under 35 U.S.C. § 119 to Korean Patent Application No. 10-2019-0059573 filed on May 21, 2019 in the Korean Intellectual Property Office, the disclosures of which are incorporated by reference in their entirety herein.

BACKGROUND

1. Technical Field

The present disclosure relates to a method of training a machine learning to predict optimal values for parameters used in an operation of an image signal processor and an electronic device configured to perform the method.

2. Discussion of Related Art

An image sensor is a semiconductor-based sensor configured to receive light and generate an electrical signal. Raw data, output by the image sensor, may be processed by an image signal processor (ISP). The image signal processor may generate an image using the raw data output by the image sensor. The image signal processor may generate an image from the raw data based on various parameters. However, quality and characteristics of the generated image may vary depending on values of the parameters applied to the image signal processor.

SUMMARY

At least one exemplary embodiment of the inventive concept provides a method predicting performance of an image signal processor or quality of images generated by the image signal using machine learning. The resulting predictions may be used to tune the image signal processor to improve quality of images generated by the image signal processor.

According to an exemplary embodiment of the inventive concept, a method of training a machine learning model to predict optimal values for a plurality of parameters used in an operation of an image signal processor includes: capturing an image of a sample subject to obtain sample data; generating a plurality of sets of sample values for the plurality of parameters; emulating the image signal processor (ISP) processing the sample data according to each of the sets to generate a plurality of sample images; evaluating each of the plurality of sample images for a plurality of evaluation items to generate respective sample scores; and training the machine learning model to predict the optimal values using the sample values and the sample scores.

According to an exemplary embodiment of the inventive concept, a method of predicting optimal values for a plurality of parameters used in an operation of an image signal processor includes: inputting initial values for the plurality of parameters to a machine learning model including an input layer having a plurality of input nodes, corresponding to the plurality of parameters, and an output layer having a plurality of output nodes, corresponding to a plurality of evaluation items extracted from a result image generated by the image signal processor; obtaining evaluation scores for the plurality of evaluation items using an output of the machine learning model; adjusting weights, applied to the plurality of parameters, based on the evaluation scores; and determining the optimal values using the adjusted weights.

According to an exemplary embodiment of the inventive concept, an electronic device includes an image signal processor and a parameter optimization module. The image signal processor is configured to process raw data, output by an image sensor, depending on a plurality of parameters to generate a result image. The parameter optimization module includes a machine learning model, receiving sample values for the plurality of parameters and outputting a plurality of sample scores indicating quality of sample images, the sample images being generated by the image signal processor processing the raw data based on the sample values, the parameter optimization module being configured to determine weights, respectively applied to the plurality of parameters, using the machine learning model. The image signal processor applies the weights to the plurality of parameters to generate a plurality of weighted parameters and generates the result image by processing the raw data using the weighted parameters.

BRIEF DESCRIPTION OF DRAWINGS

Embodiments of the present disclosure will be more clearly understood from the following detailed description, taken in conjunction with the accompanying drawings, in which.

DETAILED DESCRIPTION OF THE EXEMPLARY EMBODIMENTS

Hereinafter, exemplary embodiments of the inventive concept will be described with reference to the accompanying drawings.

Figure 1:
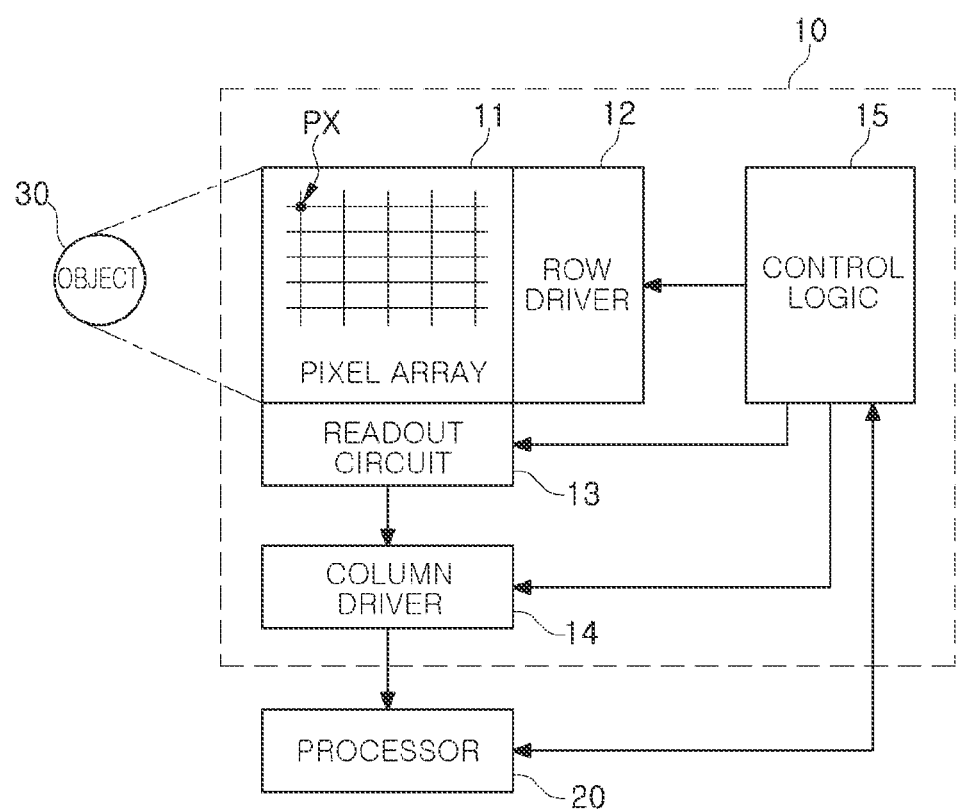
FIG. 1 is a block diagram of an image sensor according to an example embodiment.

FIG. 1 is a block diagram of an image sensor according to an exemplary embodiment of the inventive concept.

Referring to FIG. 1, an image sensor 10 according to an exemplary embodiment includes a pixel array 11, a row driver 12 (e.g., a row driving circuit), a readout circuit 13, and a column driver 14 (e.g., a column driving circuit), control logic 15 (e.g., a logic or control circuit). The row driver 12, the readout circuit 13, the column driver 14, and the control logic 16 may be circuits configured to generate image data for controlling the pixel array 11, and may be incorporated into a controller.

The image sensor 10 may convert light, transferred from an object 30, into an electrical signal to generate raw data for generating image. The raw data may be output to a processor 20. The processor 20 may include an image signal processor (ISP) configured to generate an image using the raw data. According to an exemplary embodiment of the inventive concept, the image signal processor is mounted in the image sensor 10.

The pixel array 11, incorporated in the image sensor 10, may include a plurality of pixels PX. Each of the plurality of pixels PX may include an optoelectronic component configured to receive light and generate charges based on the received light, for example, a photodiode (PD). In an exemplary embodiment, each of the plurality of pixels PX includes two or more optoelectronic components. Two or more optoelectronic components may be included in each of the plurality of pixels PX such that each of the pixels PX generates a pixel signal corresponding to light of various wavelength bands or provides an autofocusing function.

Each of the plurality of pixels PX may include a pixel circuit configured to generate a pixel signal from charges generated by one or more photodiodes. In an exemplary embodiment, the pixel circuit includes a transmission transistor, a drive transistor, a select transistor, and a reset transistor. As an example, the pixel circuit may output a reset voltage and a pixel voltage using charges generated by the photodiodes. The pixel voltage may be a voltage reflecting charges generated by photodiodes included in each of the plurality of pixels PX. In an exemplary embodiment, two or more adjacent pixels PX may constitute a single pixel group, and two or more pixels, belonging to a pixel group, may share at least some of a transmission transistor, a drive transistor, a select transistor, and a reset transistor with each other.

The row driver 12 may drive the pixel array 11 in units of rows. For example, the row driver 12 may generate a transmission control signal controlling a transmission transistor of a pixel circuit, a reset control signal controlling a reset transistor of the pixel circuit, and a select control signal controlling a select transistor of the pixel circuit.

The readout circuit 13 may include at least one of a correlated double sampler (CDS) and an analog-to-digital converter (ADC). The correlated double sampler may be connected to pixels, included in a row line selected by a row select signal provided by the row driver 12, through column lines and may perform correlated double sampling to detect a reset voltage and a pixel voltage. The analog-to-digital converter may output a digital signal after converting the reset voltage and the pixel voltage, detected by the correlated double sampler, into the digital signal.

The column driver 14 may include a latch circuit, a buffer, an amplifier circuit, and may temporarily store or amplify the digital signal, received from the readout circuit 13, to generate image data. Operating timings of the row driver 12, the readout circuit 13, and the column driver 14 may be determined by the control logic 15. As an example, the control logic 15 may be operated by a control instruction transmitted by the processor 20. The processor 20 may signal-process the raw data, output by the column driver 14 and the control logic 15, to generate an image and may output the image to a display device, or store the image in a storage device such as a memory.

Figure 2:
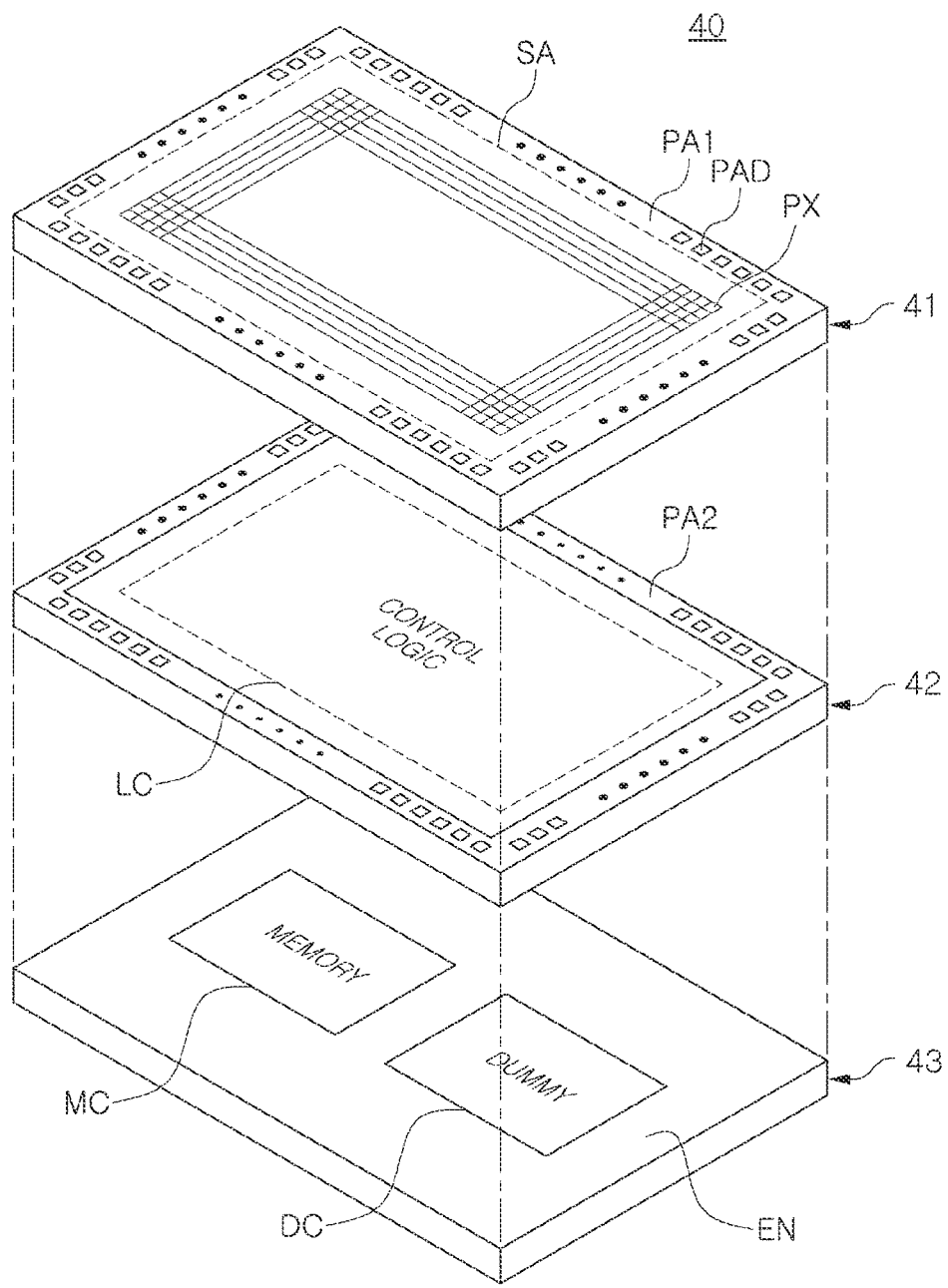
FIGS. 2 and 3 are schematic diagrams of image sensors according to an example embodiment, respectively.
Figure 3:
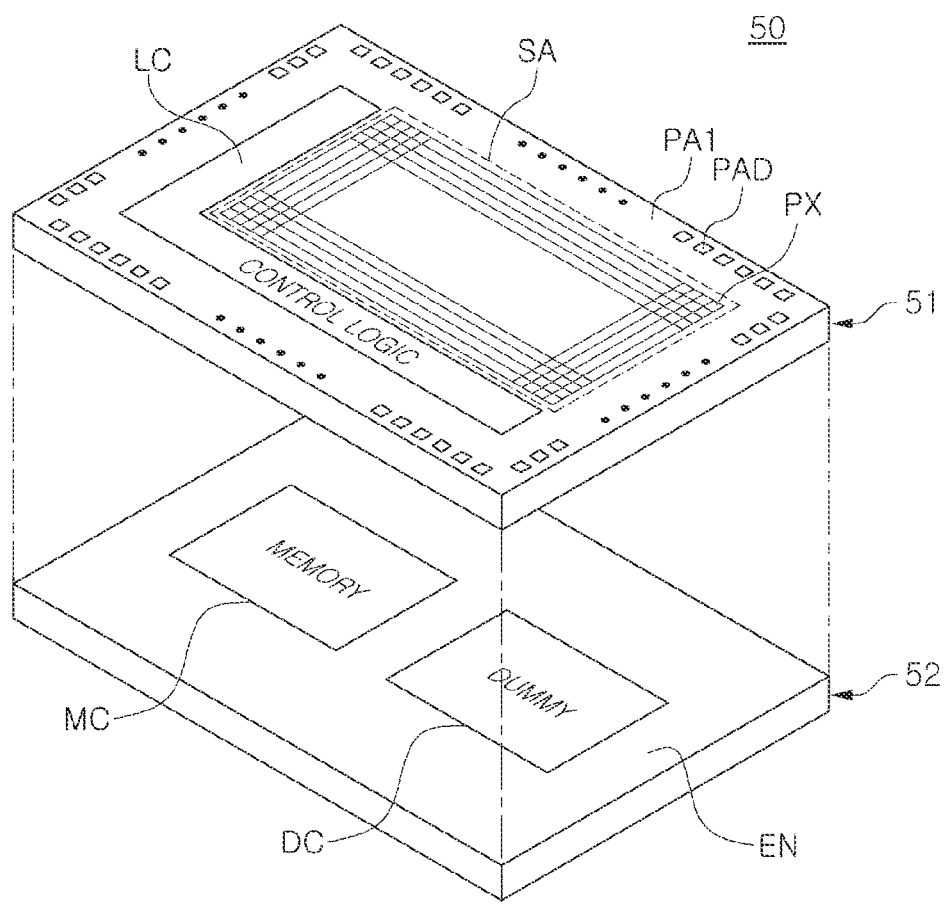

FIGS. 2 and 3 are schematic diagrams of image sensors according to exemplary embodiments, respectively.

Referring to FIG. 2, an image sensor 40 according to an exemplary embodiment includes a first layer 41, a second layer 42 provided below the first layer 41, and a third layer 43 provided below the second layer 42. The first layer 41, the second layer 42, and the third layer 43 may be stacked in a direction perpendicular to each other. In an exemplary embodiment, the first layer 41 and the second layer 42 are stacked in a wafer level, and the third layer 43 is attached to a portion below the second layer 42. The first to third layers 41, 42, and 43 may be provided as a single semiconductor package.

The first layer 41 includes a sensing area SA, in which a plurality of pixels are provided, and a first pad area PA1 provided around the sensing area SA. A plurality of upper pads PAD are included in the first pad region PA1. The plurality of upper pads PAD may be connected to pads and a logic circuit LC of the second layer 42 through a via or a wire. The pads of the second layer 42 may be provided in a second pad area PA2 of the second layer 42.

Each of the plurality of pixels PX may include a photodiode configured to receive light and generate charges and a pixel circuit configured to process the charges generated by the photodiode. The pixel circuit may include a plurality of transistors configured to output a voltage corresponding to the charges generated by a photodiode.

The second layer 42 may include a plurality of components configured to implement the control logic LC. The plurality of components implementing the logic circuit LC may include circuits configured to drive a pixel circuit provided on the first layer 41, such as a row driver, a readout circuit, a column driver, and control logic. The plurality of components implementing the logic circuit LC may be connected to a pixel circuit through the first and second pad areas PA1 and PA2. The logic circuit LC may obtain the reset voltage and the pixel voltage from the plurality of pixels PX to generate a pixel signal.

In an exemplary embodiment, at least one of the plurality of pixels PX includes a plurality of photodiodes disposed on the same level. Pixel signals, generated from charges of each of the plurality of photodiodes, may have a phase difference from each other. The logic circuit LC may provide an autofocusing function based on a phase difference of pixel signals generated from a plurality of photodiodes included in a single pixel PX.

The third layer 43, provided below the second layer 42, may include a memory chip MC, a dummy chip DC and an encapsulation layer EN encapsulating the memory chip MC and the dummy chip DC. The memory chip MC may be a dynamic random access memory (DRAM) or a static random access memory (SRAM). In an embodiment, the dummy chip DC does not store data. The dummy chip DC may be omitted. The memory chip MC may be electrically connected to at least some of the components, included in the logic circuit LC of the second layer 42, by a bump, a via, or a wire, and may store data required to provide an autofocusing function. In an exemplary embodiment, the bump is a microbump.

Referring to FIG. 3, an image sensor 50 according to an exemplary embodiment includes a first layer 51 and a second layer 52. The first layer 51 includes a sensing area SA in which a plurality of pixels PX are provided, a logic circuit LC in which components for driving the plurality of pixels PX are provided, and a first pad area PA1 provided around the sensing area SA and the logic circuit LC. A plurality of upper pads PAD are included in the first pad area PA1. The plurality of upper pads PAD may be connected to a memory chip MC, provided on the second layer 52, through a via or a wire. The second layer 52 may include a memory chip MC and a dummy chip DC, and an encapsulation layer EN encapsulating the memory chip MC and the dummy chip DC. The dummy chip DC may be omitted.

Figure 4:
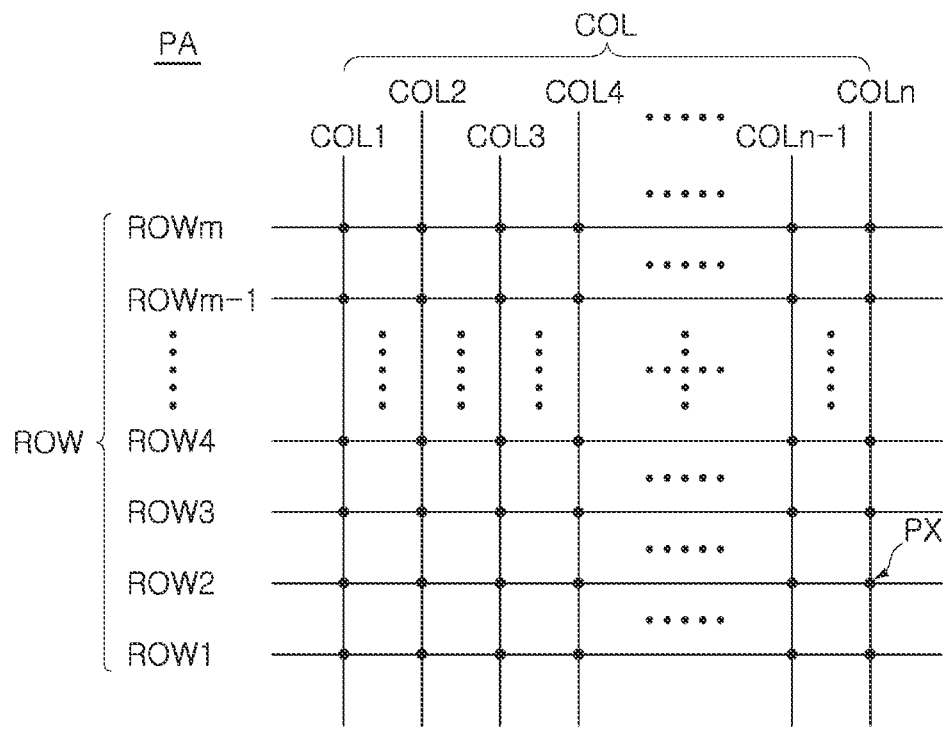
FIG. 4 illustrates a pixel array of an image sensor according to an example embodiment.

FIG. 4 illustrates a pixel array of an image sensor according to an exemplary embodiment of the inventive concept.

Referring to FIG. 4, a pixel array PA of an image sensor according to an exemplary embodiment includes a plurality of pixels PX. The plurality of pixels may be connected to a plurality of row lines ROW1 to ROWm (ROW) and a plurality of column lines COL1 to COLn (COL). For example, a given pixel of the pixels PX may be connected to a given row line of the row lines ROW1 to ROWm and to a given column line of the column lines COL1 to COLn. The image sensor may drive the plurality of pixels PX in units of the plurality of row lines ROW. As an example, time required for driving a selected driving line among the plurality of row lines ROW and reading the reset voltage and the pixel voltage from pixels PX connected to the selected driving line may be defined as one horizontal cycle. The image sensor may operate in a rolling shutter manner, in which a plurality of the pixels PX are sequentially exposed to light, or a global shutter manner in which a plurality of the pixels PX are simultaneously exposed to light.

A reset voltage and a pixel voltage, output from each of the plurality of pixels PX, may be converted into digital data and may be processed as raw data through predetermined signal processing. An image signal processor, mounted in the image sensor or an additional processor communicating with the image sensor, may generate a result image displayed on a display or stored in a memory. Accordingly, different result images may generated from the raw data depending on performance or a tuning method of the image signal processor. Thus, a user may be provided with an optimal result image by improving performance of the image signal processor or by precisely tuning the image signal processor.

When tuning of the image signal processor employs a method depending on a person's evaluation, it may be difficult to objectively and precisely tune the image signal processor. In an exemplary embodiment, the performance of the image signal processor may be improved by providing a method of modeling the image signal processor so there is no room for intervention of a person's subjective judgment. In addition, a user may be provided with an optimal result image by tuning the image signal processor in consideration of the user's desire.

Figure 5:
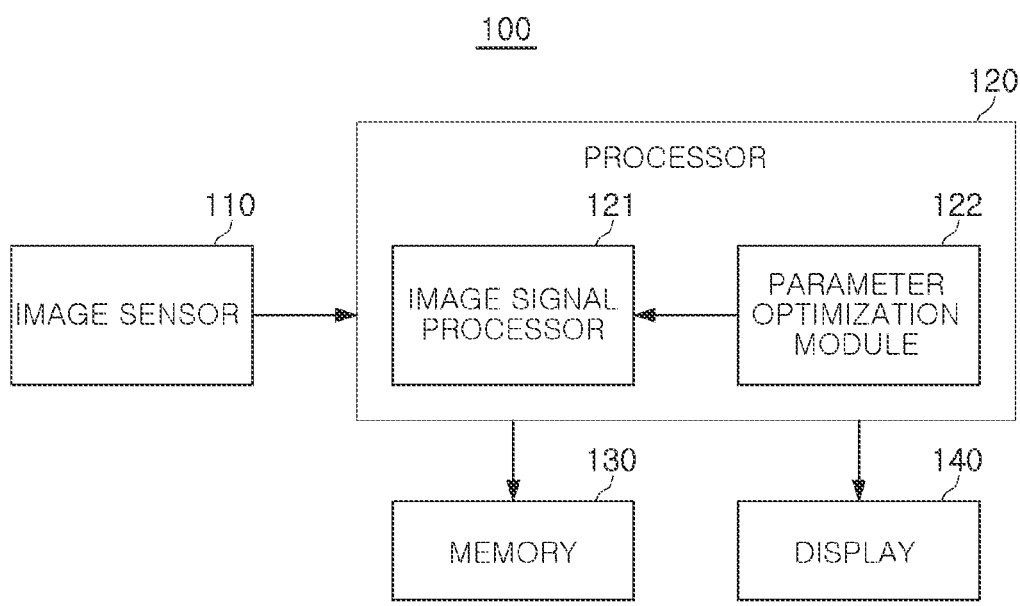
FIG. 5 is a block diagram of an electronic device according to an exemplary embodiment of the inventive concept.

FIG. 5 is a block diagram of an electronic device according to an exemplary embodiment of the inventive concept.

Referring to FIG. 5, an electronic device 100 according to an exemplary embodiment of the inventive concept includes an image sensor 110, a processor 120, a memory 130, and a display 140. The processor 120 may control overall operation of the electronic device 100, and may be implemented by a central processing unit (CPU), an application processor (AP), or a system on chip (SoC). In an exemplary embodiment, the image sensor 110 and the image signal processor are mounted on a single integrated circuit chip.

The image sensor 110 may generate raw data in response to external light and may transmit the raw data to the processor 120. The processor 120 may include an image signal processor 121 configured to signal-process the raw data to generate a result image. The image signal processor 121 may adjust a plurality of parameters associated with the raw data and signal-process the raw data according to the adjusted parameters to generate a result image. The parameters may include two or more of color, blurring, sharpness, noise, a contrast ratio, resolution, and a size. In an alternate embodiment, the parameters may include only one of color, blurring, sharpness, noise, a contrast ratio, resolution, and a size. The result image, output by the image signal processor 121, may be stored in the memory 130 or may be displayed on the display 140.

The processor 120 may include a parameter optimization module 122. In an exemplary embodiment, the parameter optimization module 122 and the image signal processor are mounted in a single integrated circuit. As an example, the parameter optimization module 122 may adjust weights given to the plurality of parameters, and characteristics of the result image, output by the image signal processor 121, can be changed depending on the adjusted weights. As an example, the parameter optimization module 122 adjusts a color, one of the plurality of parameters, to output a warm-tone result image or a cold-tone result image from the same raw data. For example, when a first weight is applied to the color parameter to generate a first weighted parameter, the image signal processor 121 processing the raw data using the first weighted parameter outputs a warm-tone result image. For example, when a second weight different from the first weight is applied to the color parameter to generate a second weighted parameter, the image signal processor 121 processing the raw data using the second weighted parameter outputs a cold-tone result image.

In an exemplary embodiment, the weight, applied to the plurality of parameters by the parameter optimization module 122, is determined by a modeling method performed in advance. The weight, applied to the plurality of parameters by the parameter optimization module 122, may be adaptively adjusted based on user feedback. As an example, a weight may be determined by a modeling method using a machine learning model to significantly reduce a possibility of intervention of a person's subjective evaluation and to improve performance of the image signal processor 121 while accurately and objectively tuning the image signal processor 121.

Figure 6:
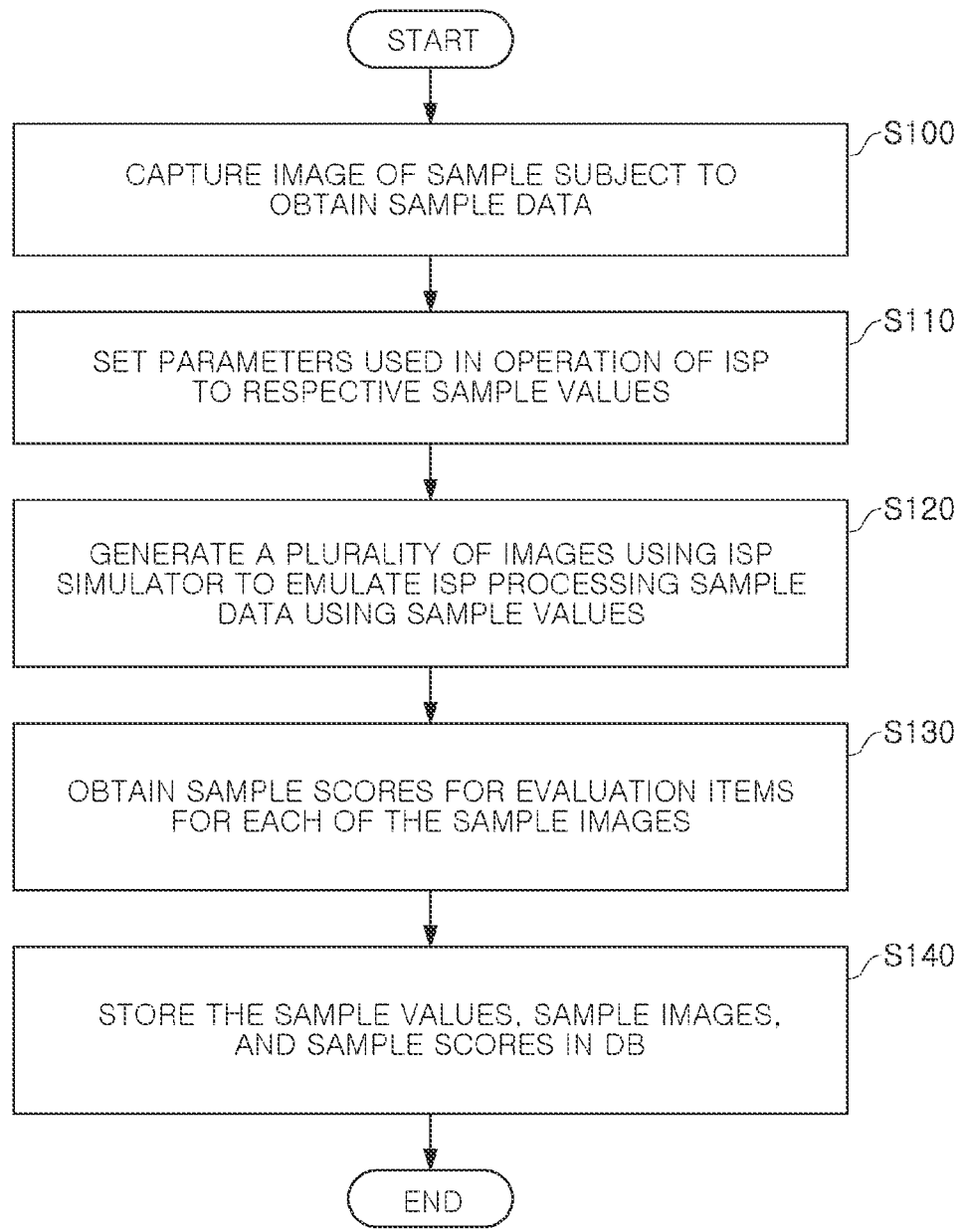
FIG. 6 is a flowchart illustrating a method of generating data that may be used to train a machine learning model for an image signal processor according to an exemplary embodiment of the inventive concept.
Figure 7:
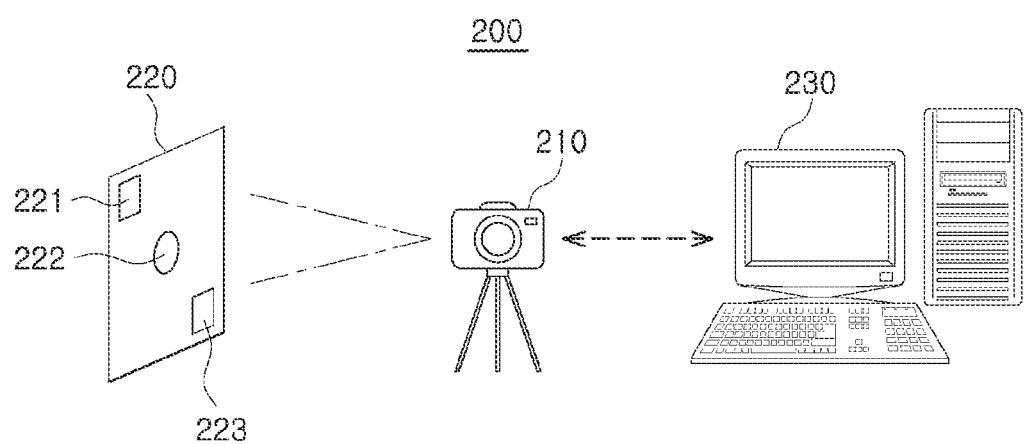
FIG. 7 illustrates a system that may use the machine learning model according to an exemplary embodiment of the inventive concept.

FIG. 6 is a flowchart illustrating a method of modeling an image signal processor according to an exemplary embodiment of the inventive concept, and FIG. 7 illustrates a system providing a method of modeling an image signal processor according to an exemplary embodiment of the inventive concept.

Referring to FIG. 6, a method of modeling an image signal processor according to an exemplary embodiment includes capturing an image of a sample subject to obtain sample data (S100). Referring to FIG. 7, a system 200 for modeling an image signal processor may include an electronic device 210, including an image sensor, a sample subject 220, and a computer device 230 in which a modeling method is executed. Although the electronic device 210 is illustrated as being a camera, it may be replaced with another device including an image sensor. In addition, although the computer device 230 is illustrated as being a desktop computer, it may be replaced with another device executing the modeling method. According to an exemplary embodiment, the electronic device 210 and the computer device 230 are implemented as a single device.

The sample subject 220 may be a test chart. The sample subject 220 may include a plurality of capturing regions 221 to 223 (regions of interest), which may be different from each other. As an example, a first capturing region 221 may be a region in which people are displayed, a second capturing region 222 may be a region in which a black-and-white pattern is displayed, and a third capturing region 223 may be a region in which a color pattern is displayed.

The sample data, obtained by the electronic device 210 capturing the sample subject 220, may be raw data. The raw data may be transferred to the computer device 230 including an image signal processor (ISP) simulator. In an embodiment, the ISP simulator is capable of simulating different types of image signal processors. For example, the ISP simulator could emulate one or more of the image signal processors processing the raw data to generate an image. Emulating a given image signal processor processing the raw data may include the given image signal processor processing the raw data using one or more parameters. For example, a given parameter may be settable to only certain values, where each setting has a different affect. For example, if the given parameter is settable to only a first value or a second other value, emulating an image signal processor processing the raw data using the given parameter set to the first value could result in a first image, while an emulating the image signal processor processing the same raw data using the given parameter set to the second value could result in a second image different from the first image.

The computer device 230 sets parameters used in an operation of an image signal processor to respective sample values (S110). The computer device 230 signal-processes the raw data using the image signal processor simulator to emulate the image signal processor processing the sample data using the sample values to generate a plurality of sample images (S120).

In the modeling method executed in the computer device 230, a plurality of sample scores of evaluation items are obtained for each of the plurality of sample images (S130). The plurality of sample scores may be scores calculated from a plurality of evaluation items selected to evaluate each of the plurality of sample images. As an example, the plurality of evaluation items may include at least one of an image color, resolution, a dynamic range, shading, sharpness, texture loss, and noise. For example, if only resolution is considered, the first sample image has a low resolution and the second sample image has a high resolution, the first sample image could receive a lower score than the second sample image.

The computer device 230 stores the sample values for the parameters, the sample images, and sample scores, in a database (DB) (S140). The database may include a mapping of each parameter to a respective sample value. For example, the sample values, sample images, and sample scores stored in the database (DB), may be used to train a machine learning model to infer the performance of the image signal processor or to predict the quality of an image that will be produced by the image signal processor when parameters having certain values are used during processing of raw data.

Figure 8:
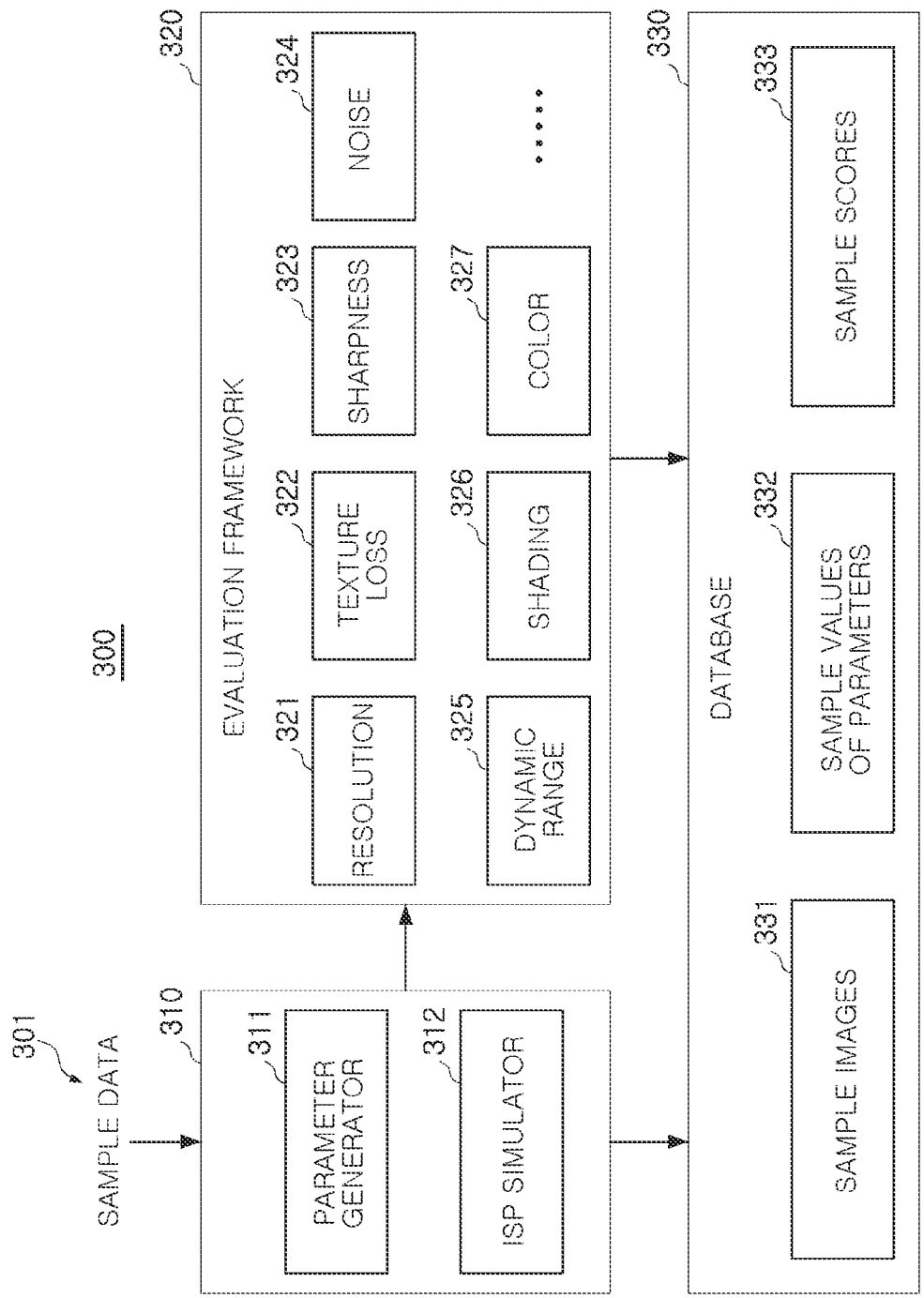
FIGS. 8 to 10 illustrate a method of training the machine learning model according to an exemplary embodiment of the inventive concept.
Figure 9:
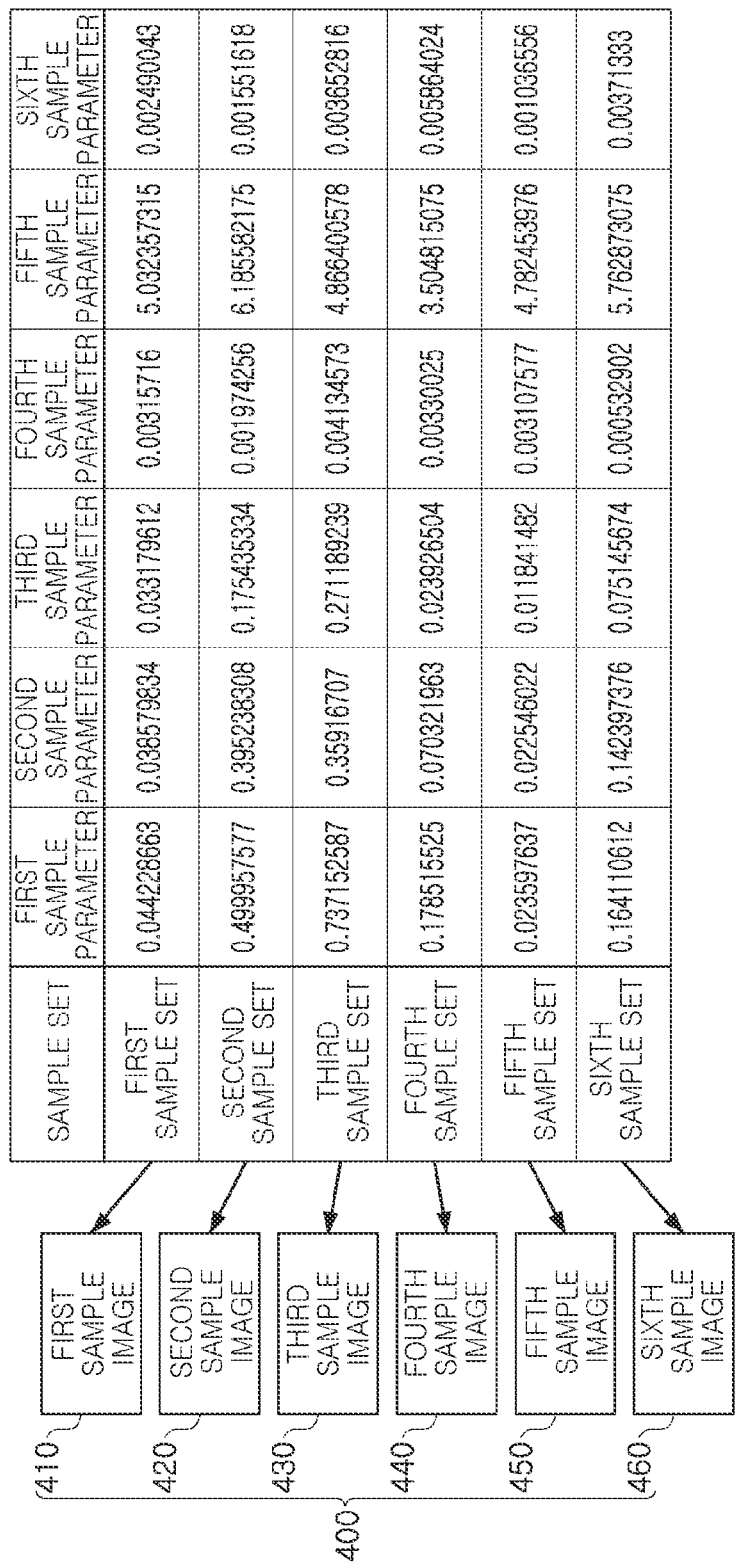
Figures 10, 11:
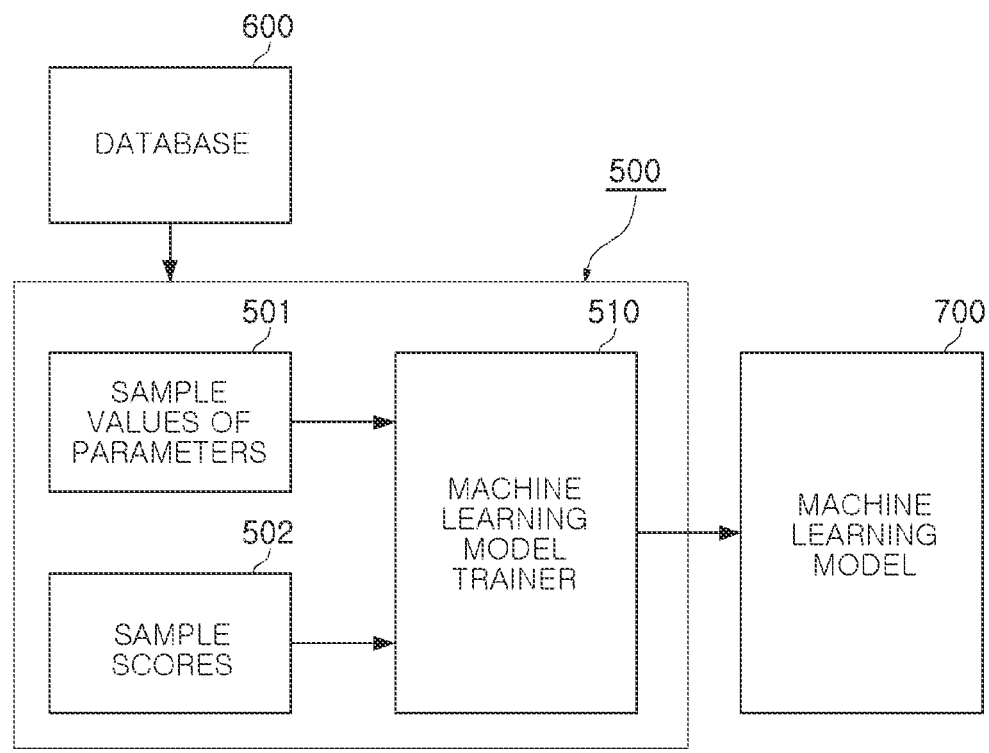
FIG. 11 illustrates a system for training the machine learning model according to an exemplary embodiment of the inventive concept.

FIGS. 8 to 10 illustrate a method of modeling an image signal processor according to an exemplary embodiment of the inventive concept.

FIG. 8 may be a schematic diagram of a system for modeling an image signal processor. Referring to FIG. 8, the system 300 includes a simulator 310, an evaluation framework 320, and a database 330.

The simulator 310 receives sample data 301, which is raw data obtained by capturing an image of a sample subject such as a test chart. The simulator 310 may include a parameter generator 311, configured to determine a plurality of sample values for a plurality of parameters 232 used in an operation of an image signal processor, and an ISP simulator 312 configured to simulate (or emulate) the image signal processor operating on the sample data 392 using the sample values of the parameters 232. For example, the parameter generator 311 may determine sample values of the parameters 232 such as image color, blurring, noise, a contrast ratio, resolution, and size. At least one of the parameters may be classified into a plurality of detailed parameters according to an embodiment. For example, there may be a plurality of detailed parameters for noise and a plurality of detailed parameters for color.

The ISP simulator 312 may signal-process the sample data 301 using the plurality of sample values 332, determined for the plurality of parameters by the parameter generator 311, to generate sample images 331. Hereinafter, the operation of the simulator 310 will be described in more detail with reference to FIG. 9.

Referring to FIG. 9, the parameter generator 311 generates a plurality of sample values for first through sixth parameters. As an example, the parameter generator 311 may generate first through sixth sample sets having different sample values for the first through sixth parameters. The first to sixth parameters are parameters used in an operation of the image signal processor. The number and types of the parameters may be variously changed. Similarly, the number of sample sets, generated by setting the sample values for the parameters by the parameter generator 311, may also be variously changed.

When the sample sets are determined, the ISP simulator 312 generates the first through sixth sample images 410 to 460 (400) by setting parameters to each of the sample sets and simulating (or emulating) the operation of the image signal processor on the sample data 301 using each of the sample sets. For example, the ISP simulator 312 may emulate the image signal processor processing raw data of the sample data 301 using the 6 sample parameters set to their respective values in the first sample set to generate the first sample image 410, emulate the image signal processor processing the raw data using the 6 sample parameters set to their respective values in the second sample set to generate the second sample image 420, etc. In an exemplary embodiment, the sample images 400 are images generated from the sample data 301 obtained by capturing an image of the same sample subject. Since the sample images 400 are images generated by the ISP simulator 312 by different sample sets, they may have different quality and/or characteristics.

Returning to FIG. 8, the evaluation framework 320 receives sample images, generated by the simulator 310, to evaluate the quality of the sample images. As an example, the evaluation framework 320 may evaluate each of the sample images for a plurality of evaluation items and may express a result of the evaluation as sample scores 333. In the example embodiment illustrated in FIG. 8, the evaluation framework 320 may obtain sample scores 333 of evaluation items such as resolution 321, texture loss 322, sharpness 323, noise 324, a dynamic range 325, shading 326, and a color 327, for each of the sample images. Hereinafter, this will be described in more detail with reference to FIG. 10.

Referring to FIG. 10, the evaluation framework 320 receives the sample images 400 to obtain sample scores 333 for a plurality of evaluation items. As an example, sample scores for the first through third evaluation items may be obtained by evaluating each of the sample images 400. For example, the first evaluation item could be resolution 321, the second evaluation item could be sharpness 323, and the third evaluation item could be noise 324. The evaluation framework 320 may classify and store the sample scores depending on the sample images 400. A lowest point and a highest point of each of the sample scores may vary depending on the sample items. For example, as shown in FIG. 10, the first sample image 410 includes a first score of 70.37 for the first evaluation item, a second score of 62.29 for the second evaluation item, and a third score of 1979.25 for the third evaluation item.

When the evaluation by the evaluation framework 320 has completed, the database 330 may be established. The database 330 includes sample images 331 and sample values 332 of the plurality of parameters, generated by the simulator 310, and sample scores 333 obtained by evaluating the sample images 331 for the plurality of evaluation items 321 to 327 by the evaluation framework.

The sample images 331, the sample values 332 of the plurality of parameters, and the sample scores 333, stored in the database 330, may be used to train the machine learning model. The machine learning model, trained by data stored in the database 330, may be a model for predicting the quality of a result image output by the image signal processor. Hereinafter, this will be described in more detail with reference to FIGS. 11 and 12.

Figure 12:
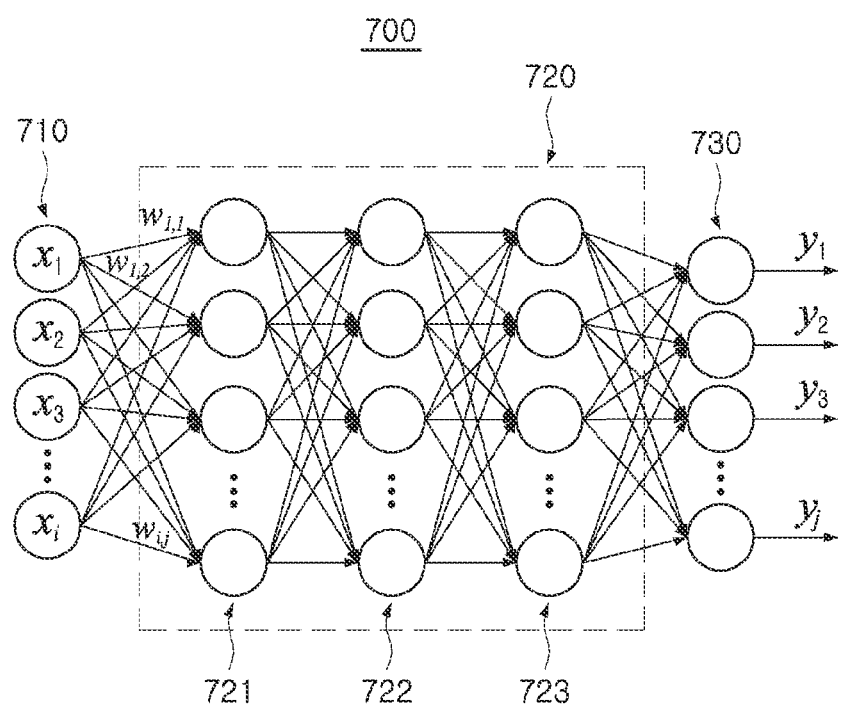
FIG. 12 illustrates the machine learning model according to an exemplary embodiment of the inventive concept.

FIG. 11 illustrates a system providing a method of modeling an image signal processor according to an exemplary embodiment of the inventive concept, and FIG. 12 illustrates a machine learning model employed in a method of modeling an image signal processor according to an exemplary embodiment of the inventive concept.

Referring to FIG. 11, a system 500 according to an exemplary embodiment may operate in cooperation with a database 600. The database 600 may be a database established by the modeling method described with reference to FIGS. 8 to 10, and may include sample images, sample values for a plurality of parameters, and sample scores for a plurality of evaluation items.

In an exemplary embodiment, the machine learning model trainer 510 trains a machine learning model 700 to predict a quality of an image produced by a given image signal processor using parameters have certain values using sample values 501 of the parameters and sample scores 502 stored in the database 600. As an example, the sample values 501 of the parameters may be at least one of first to sixth sample sets set in the same manner as described in the example embodiment with reference to FIG. 9. As an example, when the first sample set is selected, a first sample score set in the example embodiment, illustrated in FIG. 10, may be selected as the sample scores 502.

The machine learning model trainer 510 may input sample values, included in the first sample set, to the machine learning model 700. In an exemplary embodiment, the machine learning model trainer 510 trains the machine learning model 700 until the output of the machine learning model 700 matches evaluation scores of the first sample score set or a difference between evaluation scores of the first sample score set becomes less than or equal to a reference difference.

Referring to FIG. 12, the machine learning model 700 may be implemented by an artificial neural network (ANN). The machine learning model 700 includes an input layer 710, a hidden layer 720, an output layer 730. As an example, a plurality of nodes, included in the input layer 710, the hidden layer 720, and the output layer 730, may be connected to each other in a fully connected manner. The input layer 710 includes a plurality of input nodes $x_1$ to $x_i$. In an exemplary embodiment, the number of the input nodes $x_1$ to $x_i$ corresponds to the number of parameters. The output layer 730 includes a plurality of output nodes $y_1$ to $y_j$. In an exemplary embodiment, the number of the output nodes $y_1$ to $y_j$ corresponds to the number of evaluation items.

The hidden layer 720 includes first to third hidden layers 721 to 723, and the number of the hidden layers 721 to 723 may be variously changed. As an example, the machine learning model 700 may be trained by adjusting weights of the hidden nodes included in the hidden layer 720. For example, the first to sixth sample sets are input to the input layer 710 and the weights of the hidden nodes, included in the hidden layer 720, may be adjusted until values, output to the output layer 730, correspond to the first to sixth sample score set. Accordingly, after the training has completed, quality of a result image, output by the image signal processor, may be inferred using the machine learning model 700 when the parameters have predetermined values.

Figure 13:
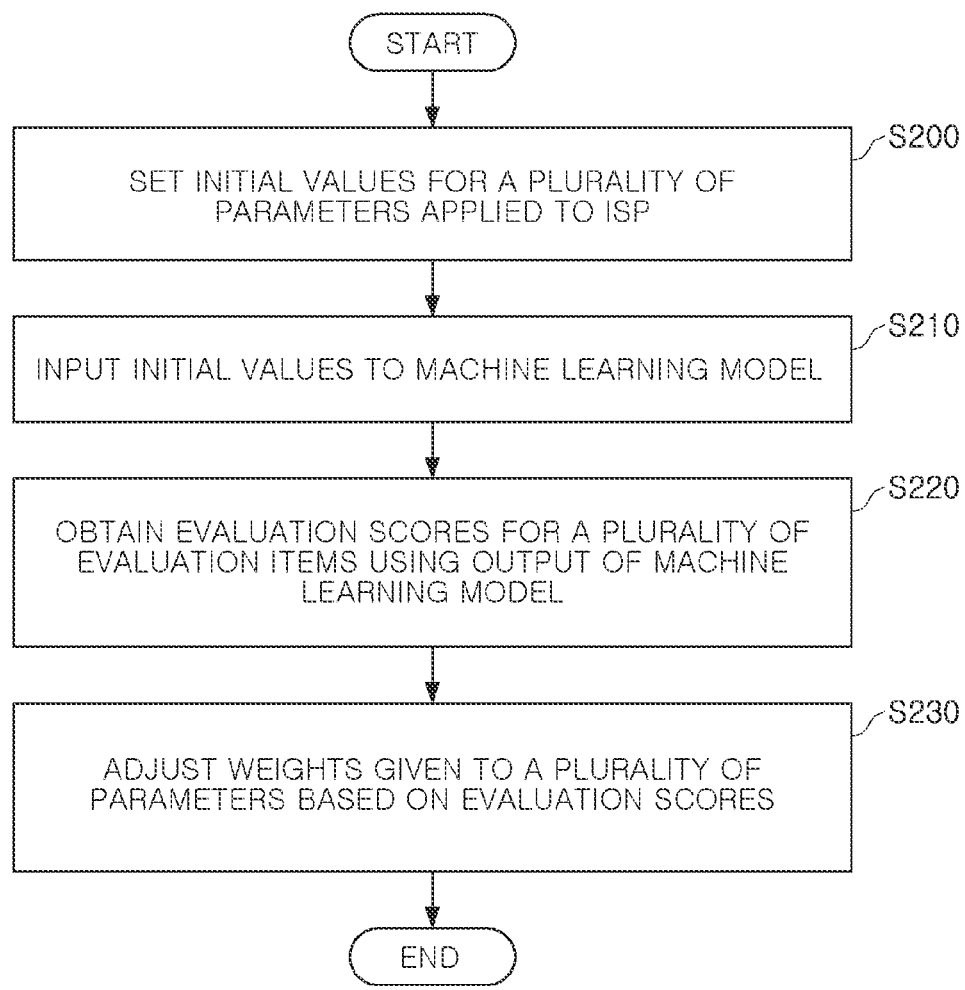
FIG. 13 is a flowchart illustrating a method of operating the machine learning model according to an exemplary embodiment of the inventive concept.

FIG. 13 is a flowchart illustrating a method of modeling an image signal processor according to an exemplary embodiment of the inventive concept.

Referring to FIG. 13, a method of modeling an image signal processor according to an exemplary embodiment of the inventive concept includes setting initial values for a plurality of parameters applied to an image signal processor (S200). The plurality of parameters applied to the image signal processor may include a color, blurring, noise, a contrast ratio, a resolution, and a size an image as parameters used in an operation of the image signal processor.

Next, the initial values for the parameters are input to the machine learning model (S210). The machine learning model may be a model trained to predict the quality of the resulting image output by the image signal processor. An output of the machine learning model may vary depending on the values of the parameters applied to the image signal processor. A training process of the machine learning model may be understood based on the example embodiment described above with reference to FIGS. 11 and 12.

Evaluation scores for a plurality of evaluation items are obtained using the output of the machine learning model (S220). As described above, the machine learning model is a model trained by the image signal processor to predict the quality of a result image generated by signal-processing raw data, and the output of the machine learning model corresponds to the evaluation scores of a plurality of evaluation items. In an exemplary embodiment, the plurality of evaluation items may include a color, sharpness, noise, resolution, a dynamic range, shading, and texture loss of an image.

In the modeling method according to an exemplary embodiment, weights applied to the parameters are adjusted based on the obtained evaluation scores for the plurality of evaluation items (S230). As an example, each of the evaluation scores may be compared with predetermined reference scores and, when there is an evaluation score which does not reach a reference score, the weight is applied to at least one of the parameters may be increased or decreased such that the corresponding evaluation score may be increased. Alternatively, the evaluation score, output by the machine learning model, may be compared with a reference score while changing a weight by a predetermined number of times.

FIGS. 14 to 17 illustrate a method of modeling an image signal processor according to an exemplary embodiment of the inventive concept.

Figure 14:
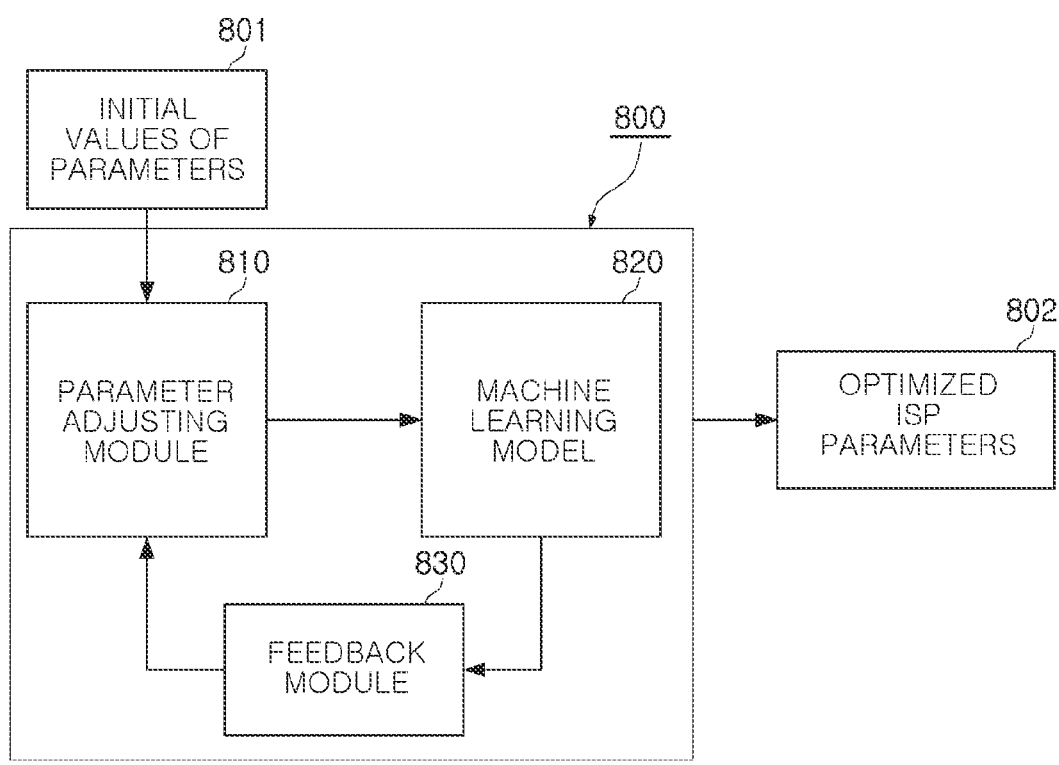
FIG. 14 illustrates a system providing a method of operating the machine learning model according to an exemplary embodiment of the inventive concept.

FIG. 14 is a schematic diagram of a system for providing a method of modeling an image signal processor according to an exemplary embodiment of the inventive concept. Referring to FIG. 14, a system 800 according to an exemplary embodiment includes a parameter adjusting module 810, a machine learning model 820, and a feedback module 830.

The parameter adjusting module 810 may adjust values input to a machine learning model 820. The machine learning model 820 may receive parameters used in an operation of an image signal processor, and may output evaluation scores indicating quality and/or characteristics of a resulting image generated by the image signal processor operating depending on values of the parameters. Accordingly, the parameter adjusting module 810 may adjust the values of the parameters used in the operation of the image signal processor. For example, the parameter adjusting module 810 may adjust weights applied to the parameters. When initial values of parameters 801 are input, the parameter adjusting module 810 may apply predetermined weights to the initial values of the parameters to generate weighted values of the parameters, and input the weighted values to the machine learning model 820.

The machine learning model 820 may be a model trained to predict the quality of the resulting image generated by the image signal processor. An output of the machine learning model 820 may correspond to an evaluation score of the evaluation items indicating quality of a result image. In an exemplary embodiment, the feedback module 830 compares an output of the machine learning model 820 with a target score of the evaluation items and transmits a result of the comparison to the parameter adjusting module 810. In an exemplary embodiment, the parameter adjusting module 810 adjusts weights applied to the parameters, with reference to a comparison result transmitted by the feedback module 830. The parameter adjusting module 810 may adjust the weights applied to the parameters, a predetermined number of times or until the difference between the evaluation scores and the target scores output by the machine learning model 820 is reduced to be less than or equal to the reference difference. When adjusting the weights has finished, optimized ISP parameters 802 (e.g., parameters set to optimal values) may be output from the system 800. The parameters set to the optimal values may be used to tune an image signal processor. The parameters set to the optimal values may be output to the image signal processor for storage on the image signal processor and then the image signal processor can use the parameters set to these values when performing a subsequent operation (e.g., process raw data to generate an image).

The system 800 may adjust the weights applied to the parameters, by considering feedback from a user of an electronic device in which an image signal processor is mounted. In this case, the system 800 may be mounted in the electronic device together with the image signal processor and may adaptively adjust the weights with reference to the feedback from the user.

Figures 15, 16:
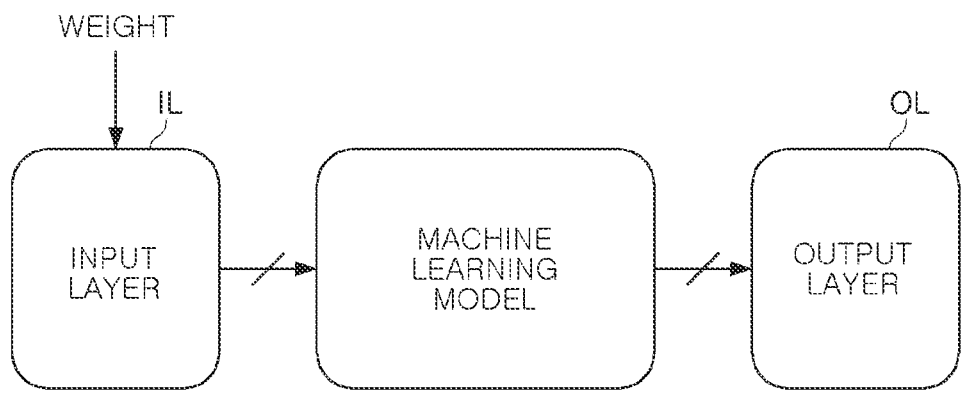
FIGS. 15 to 17 illustrate a method of operating the machine learning model according to an exemplary embodiment of the inventive concept.
Figure 17:
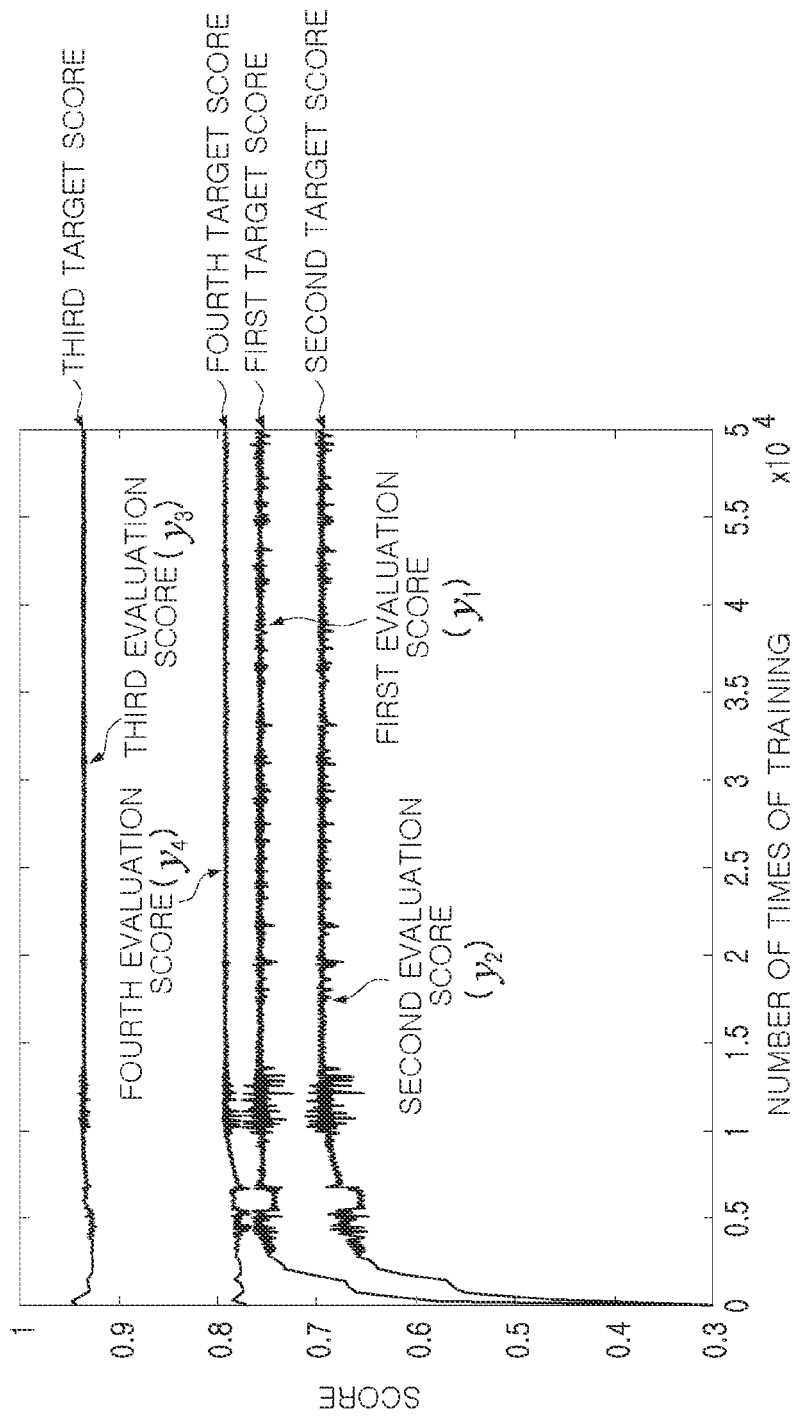

FIGS. 15 to 17 are provided to illustrate a method of modeling an image signal processor according to an exemplary embodiment of the inventive concept. Referring to FIG. 15, initial values may be set for first to sixth parameters. The initial values may be any values generated at random.

Referring to FIG. 16, a predetermined weight may be reflected on an input layer IL to be input to the machine learning model. For example, the input layer IL may receive a plurality of input values, and the plurality of input values may correspond to parameters used in an operation of the image signal processor. A weight may be applied to the plurality of input values, and the plurality of input values and the weight may be connected in a fully connected manner or a partially connected manner. When the plurality of input values and the weight correspond to each other in the partially connected manner, the weight is not connected to at least one of the plurality of input values.

The machine learning model may output at least one output value to an output layer OL using a plurality of weight-given input values. The output value may correspond to an evaluation score of an evaluation item which may indicate the quality of the image generated by the image signal processor. The number of input values included in the input layer IL, and the number of output values included in the output layer OL, may be variously changed according to exemplary embodiments.

FIG. 17 is a graph illustrating variation of evaluation scores $y_1$ to $y_4$ depending on the number of times of training of the machine learning model. In the exemplary embodiment illustrated in FIG. 17, it is assumed that the output layer OL outputs the evaluation scores y1 to y4 for four evaluation items. However, the assumption is merely an exemplary embodiment as a shape of the layer is not limited thereto.

When the machine learning model outputs first to fourth evaluation scores y1 to y4, the first to fourth evaluation scores $y_1$ to $y_4$ are compared with the first to fourth target scores, respectively. At least one of the weights, applied to the plurality of input values, may be changed depending on a result of the comparison. In the exemplary embodiment illustrated in FIG. 17, weights applied to hidden nodes of a hidden layer included in the machine learning model, are not adjusted while weights applied to the plurality of input values in the input layer IL of the machine learning model, are adjusted.

As training is repeated while changing at least one of the weights, the first to fourth evaluation scores $y_1$ to $y_4$ output by the machine learning model, may be approximated to each of the first to fourth target scores. At least one of the weights may be adjusted until a predetermined number of times of training completes or until a difference between the first to fourth evaluation scores $y_1$ to $y_4$ and the first to fourth target scores is reduced to be less than a reference difference. When the number of times of training completes or the difference between the first to fourth evaluation scores $y_1$ to $y_4$ and the first to fourth target scores is reduced to less than the reference difference, weights may be determined. The determined weights may be assigned to input values of the input layer IL, corresponding to parameters used in an operation of the image signal processor, in the fully connected manner or the partially connected manner.

Raw data, obtained by capturing an image of a sample subject, may be input to the image signal processor to tune the image signal processor, and the image signal processor may be tuned to satisfy predetermined evaluation conditions output by the image signal processor. In this case, since the image signal processor is tuned using the raw data obtained by capturing of an image of the sample subject, a relatively long time may be required. In addition, when the tuning depends on a person's objective evaluation, it may be difficult to objectively and precisely tune the image signal processor.

Meanwhile, in at least one exemplary embodiment of the inventive concept, image data obtained by capturing an image of at least one sample subject, is processed by the image signal processor simulator according to sample values of various parameters to generate sample images. Sample scores, obtained by evaluating the sample images, and sample values of the parameters may be stored in a database. Since the sample scores and sample values of the parameters stored in the database are numerical items, an effect of a person's subjective evaluation may be significantly reduced. In addition, a machine learning model trained to receive the sample values of the parameters and to output sample scores, may be prepared. Weights, applied to the parameters, may be adjusted such that evaluation scores output by the machine learning model receiving initial values of the parameters, reach target scores.

In at least one exemplary embodiment, an image sensor processor is tuned by adjusting weights applied to parameters used in an operation of the image signal processor, with numerical items, and an effect of a person's subjective evaluation may be significantly reduced to objectively and precisely tune the image signal processor. Additionally, the image signal processor may be adaptively tuned depending on a user by considering an end-user's desire in processes of comparing the evaluation scores outputted by the machine learning model, with target scores and adjusting weights of the parameters.

Figure 18:
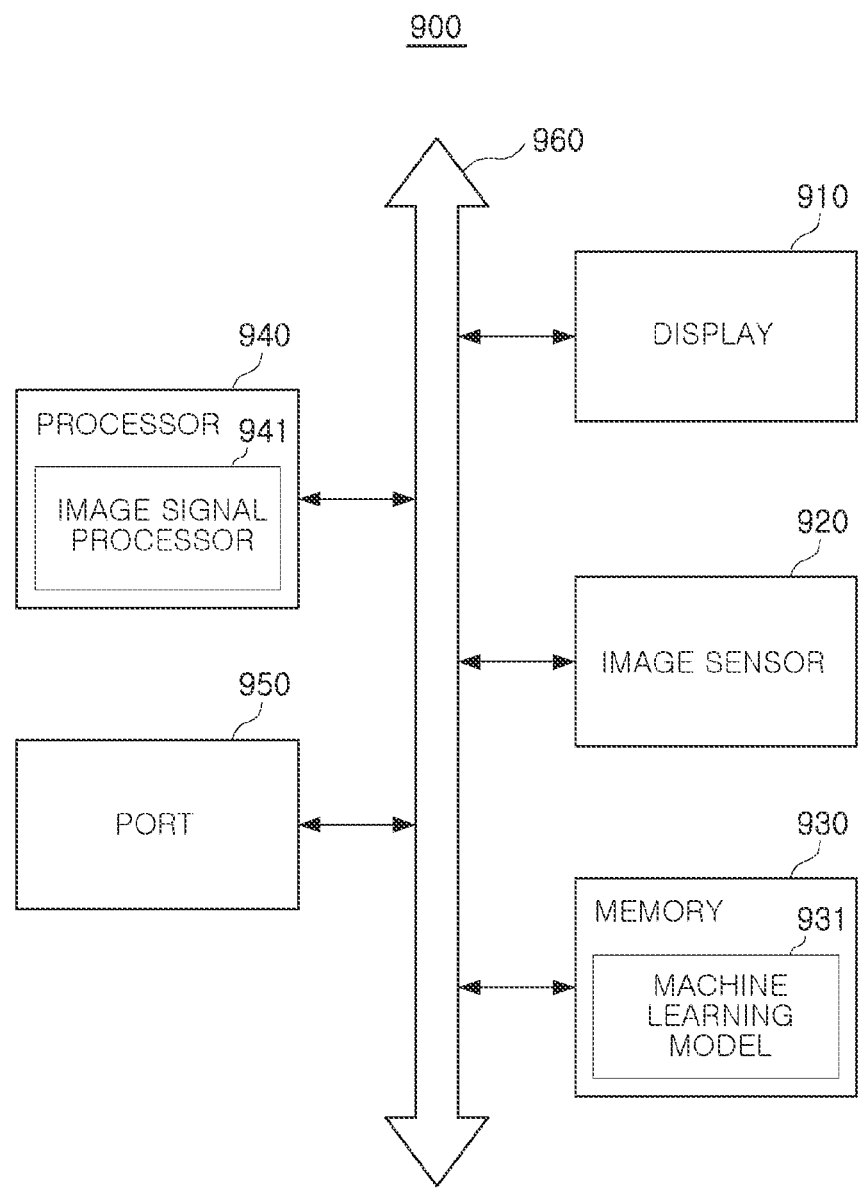
FIG. 18 is a block diagram of an electronic device according to an exemplary embodiment of the inventive concept.

FIG. 18 is a block diagram of an electronic device according to an exemplary embodiment of the inventive concept.

An electronic device 900 according to an exemplary embodiment illustrated in FIG. 18 includes a display 910, an image sensor 920, a memory 930, a processor 940, and a port 950. The electronic device 900 may further include a wired/wireless communications device and a power supply. Among components illustrated in FIG. 18, the port 950 may be provided for the electronic device 900 to communicate with a video card, a sound card, a memory card, and a universal serial bus (USB) device. The electronic device 900 may conceptually include all devices, which employ the image sensor 920, in addition to a smartphone, a tablet personal computer (PC), and a digital camera.

The processor 940 may perform a specific operation, command, or task. The processor 940 may be a central processing unit (CPU) or a system on chip (SoC), and may communicate with the display 910, the image sensor 920, and the memory 930 as well as other devices connected to the port 950 through a bus 960.

The processor 940 may include an image signal processor 941. The image signal processor 941 generates a result image using raw data generated by the image sensor 920 capturing an image of a subject. The processor 940 may display the result image generated by image signal processor 941 on the display 910 and may store the result image in memory 930.

The memory 930 may be a storage medium configured to store data necessary for an operation of the electronic device 900 or multimedia data. The memory 930 may include a volatile memory such as random access memory (RAM) or a nonvolatile memory such as a flash memory. The memory 930 may also include at least one of a solid state drive (SSD), a hard disk drive (HDD), and an optical drive (ODD) as a storage device.

The memory 930 may include a machine learning model 931 such as the machine learning model 700. The machine learning model 931 may receive parameters used in an operation of the image signal processor 941, and may output evaluation scores of evaluation items indicating a quality of the result image generated by the image signal processor 941 using the parameters. As an example, the parameters input to the machine learning model 931 may include a color, blurring, noise, a contrast ratio, a resolution, and a size of an image. The evaluation scores, output by the machine learning model 931, may correspond to evaluation items such as a color, sharpness, noise, a resolution, a dynamic range, shading, and texture loss of the image.

The electronic device 900 may adaptively adjust weights applied to the parameters used in the operation of the image signal processor 941, using the machine learning model 931. In an exemplary embodiment, the electronic device 900 does not train the machine learning model 931 itself and merely adjusts the weights applied to the parameters in a front end of an input layer of the machine learning model 931. Thus, the image signal processor 941 may be tuned for a user without great burden of an arithmetic operation.

Figure 19A:
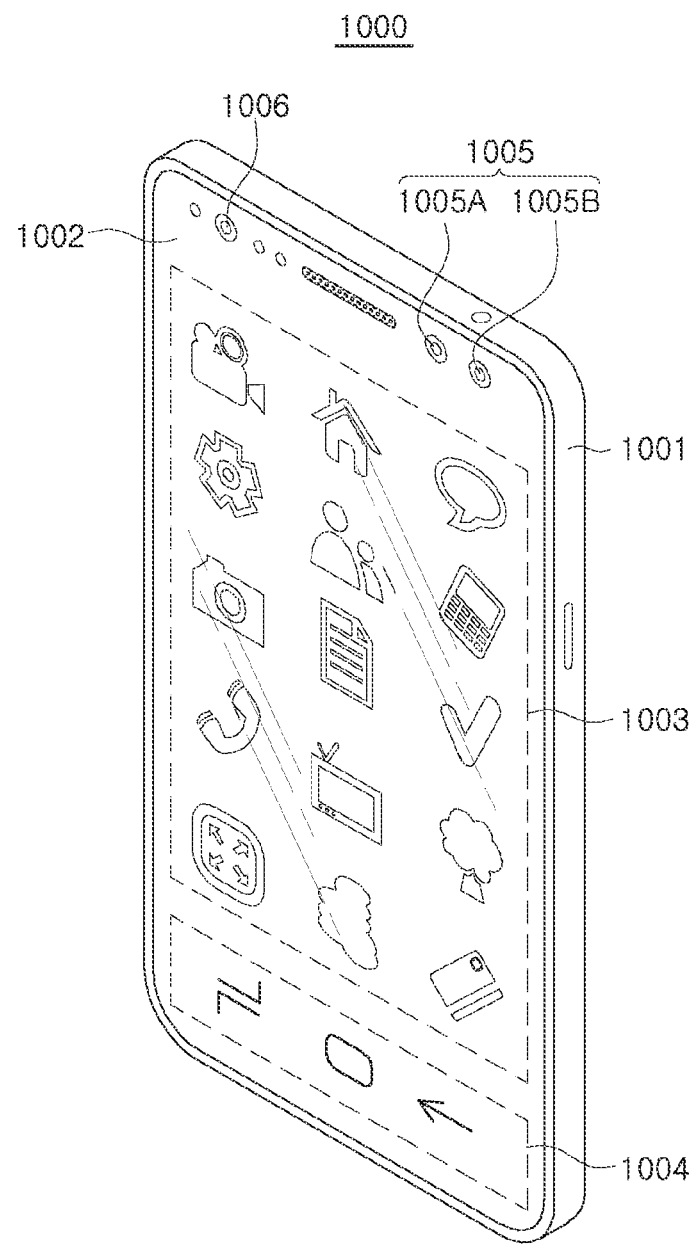
FIGS. 19A and 19B illustrate an electronic device according to an exemplary embodiment of the inventive concept.
Figure 19B:
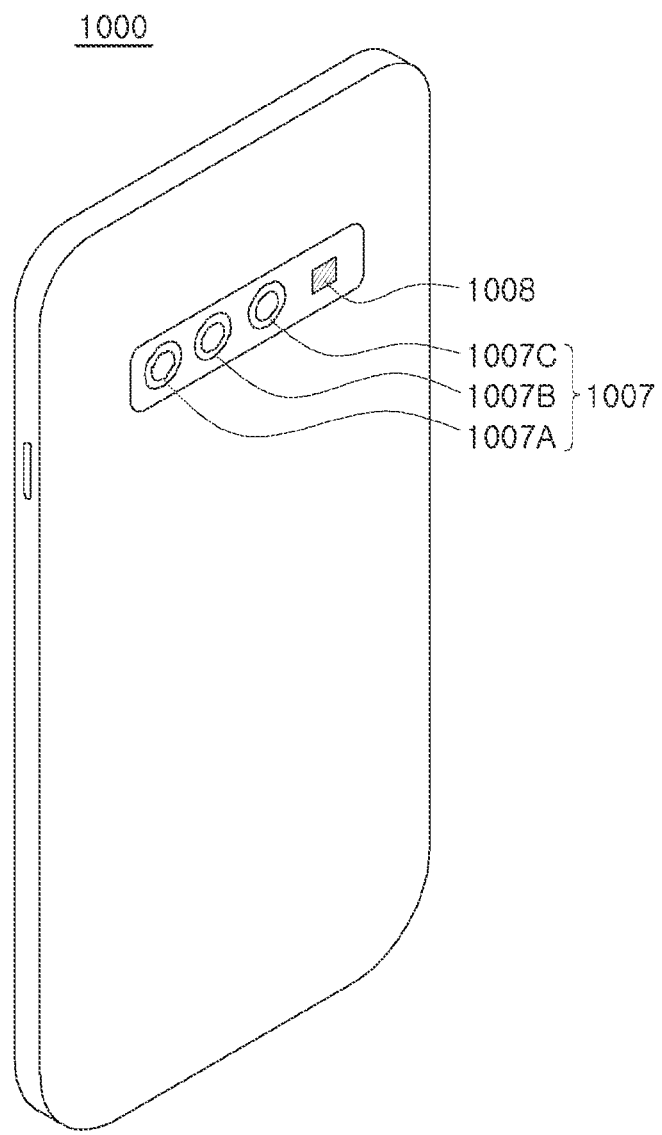

FIGS. 19A and 19B illustrate examples of electronic devices that may include the electronic device 900.

Referring to FIGS. 19A and 19B, an electronic device 1000 according to an exemplary embodiment is a mobile device such as a smartphone. However, the electronic device 1000 is not limited to a mobile device such as a smartphone. For example, and the electronic device 100 may be any device including a camera which captures an image.

The electronic device 1000 includes a housing 1001, a display 1002, and cameras 1005 and 1006. In an exemplary embodiment, the display 1002 substantially covers an entire front surface of the housing 1001 and includes a first region 1003 and a second region 1002, depending on an operating mode of the electronic device 1000 or an application which is being executed. The display 1002 may be provided integrally with a touch sensor configured to sense a user's touch input.

The cameras 1005 and 1006 may include a general camera 1005 and a time-of-flight (ToF) camera 1006. The general camera 1005 may include a first camera 1005A and a second camera 1005B. The first camera 1005A and the second camera 1005B may be implemented with image sensors having different angles of view, different aperture values, or a different number of pixels. Due to a thickness of the housing 1001, it may be difficult to employ a zoom lens for adjusting an angle of view and an aperture value in the general camera 1005. Accordingly, the first camera 1005A and the second camera 1005B, having different angles of view and/or different aperture values, may provide an image capturing function satisfying user's various needs.

The ToF camera 1006 may be combined with an additional light source to generate a depth map. The ToF camera 1006 may provide a face recognition function. As an example, the ToF may operate in combination with an infrared light source.

Referring to FIG. 19B illustrating a back surface of the electronic device 1000, a camera 1007 and a light emitting unit 1008 may be disposed on the rear surface. Similar to the camera 1005 disposed on a front surface of the electronic device 1000, the camera 1007 includes a plurality of cameras 1007A to 1007C having at least one of different aperture values, different angles of view, and a different number of pixels of the image sensor. The light emitting unit 1008 may employ a light emitting diode (LED) as a light source and may operate as a flash when capturing images using the camera 1007.

As described with reference to FIGS. 19A and 19B, an electronic device 1000, having two or more cameras 1005 to 1007 mounted therein, may provide various image capturing functions. An image signal processor, mounted in the electronic device 1000, needs to be appropriately tuned to improve the quality of a result image captured by the cameras 1005 to 1007.

The image signal processor, mounted in the electronic device 1000, may process raw data generated by the cameras 1005 to 1007 depending on values of a plurality of parameters to generate a result image. Quality or characteristics of the result image may depend on the values of the parameters, applied to the image signal processor, in addition to the raw data. In an exemplary embodiment, weights are applied to the parameters used in an operation of the image signal processor to generated weighted parameters, and the quality and characteristics of the result image are improved by adjusting the weights.

Alternatively, weights are applied to the parameters used in an operation of the image signal processor to generate weighted parameters, and a user of the electronic device 1000 adjusts the weights to generate a preferred result image. For example, the electronic device 1000 may directly receive feedback from the user to adjust the weights applied to the parameters. Alternatively, a color, sharpness, and a contrast ratio of the user's preferred image may be accumulated depending on a capturing site (e.g., the location where an image of the subject was captured), a capturing time (e.g., a time when the image of the subject was captured), and type of a captured subject, and thus, weights of the parameters, applied to the image signal processor, may be changed.

As an example, when the user prefers low sharpness and warm colors for images on which people are captured outdoors on a sunny day, the electronic device 1000 may adjust the weights applied to the parameters in a front end of an input layer of a machine learning model, such that among the evaluation scores output by an embedded machine learning model, sharpness and a color are adjusted toward a user's preference. The adjusted weights may be stored in a memory, and may be applied to the parameters of the image signal processor when a capturing environment, in which a person is selected as a subject outdoors on a sunny day, is recognized.

Figure 20:
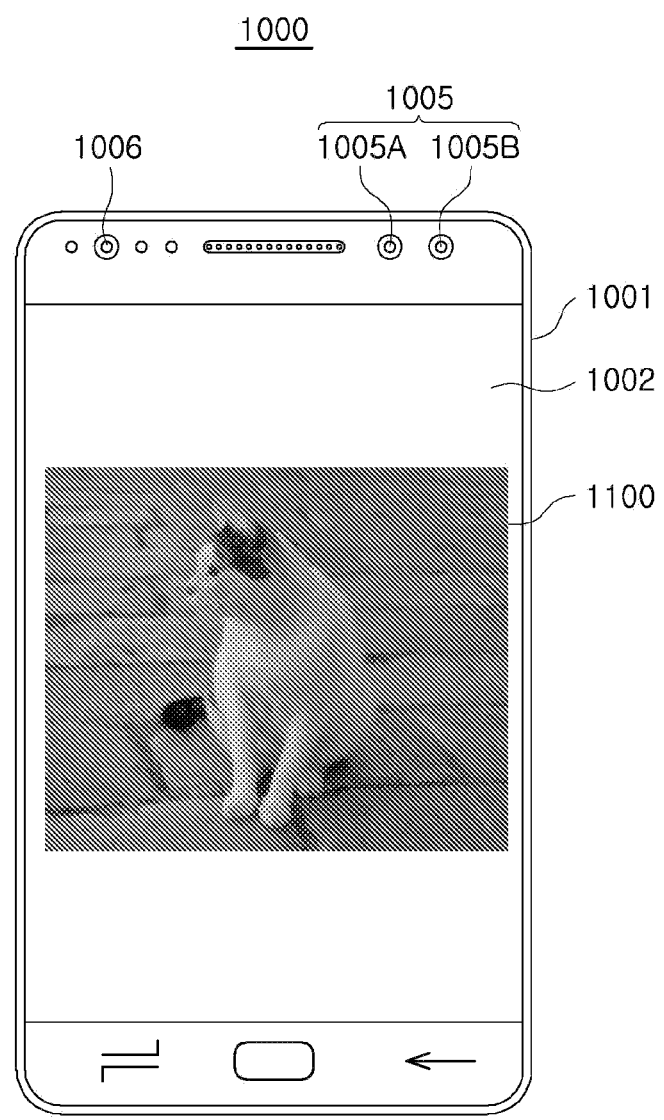
FIGS. 20 and 21 illustrate an operation of an electronic device according to an exemplary embodiment of the inventive concept.
Figure 21:
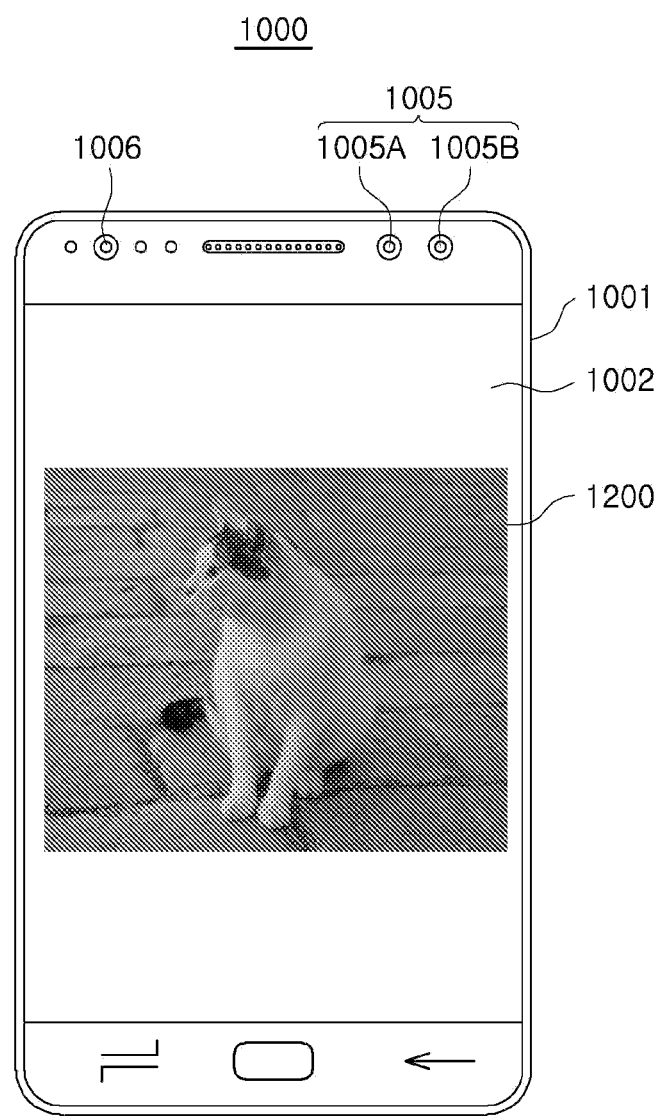

FIGS. 20 and 21 illustrate an operation of an electronic device according to an exemplary embodiment of the inventive concept.

FIG. 20 is a raw image corresponding to an image before an image signal processor signal-processes raw data, and FIG. 21 is a result image generated by signal-processing raw data by an image signal processor. In the exemplary embodiments illustrated in FIGS. 20 and 21, the raw image may exhibit poorer noise characteristics than the result image. For example, certain weights applied to parameters of an image signal processor, may be set to values which improve noise characteristics. For example, other weights applied to parameters of an image signal processor, may be determined to be values deteriorating noise characteristics depending on user setting or a capturing environment.

As described above, according to an exemplary embodiment, a plurality of parameters that determine operating characteristics of an image signal processor, may be tuned using a machine learning model. Weights for the plurality of parameters, applied to the image signal processor, may be determined using the machine learning model such that the image signal processor achieves optimal performance. Accordingly, the image signal processor may be objectively and precisely tuned, as compared with a conventional manner in which a person manually tunes the image signal processor. In addition, weights applied to parameters may be adjusted by considering feedback received from a user of an electronic device in which an image signal processor is mounted. Thus, an image signal processor optimized for the user may be implemented.

While exemplary embodiments of the inventive concept have been shown and described above, it will be apparent to those skilled in the art that modifications and variations can be made without departing from the scope of the present inventive concept.

What is claimed is:

1. A method of optimizing parameters for an image signal processor (ISP), comprising:
   receiving sample data from an image sensor;
   generating a plurality of different sample sets, each of the plurality of different sample sets including sample values for a plurality of parameters;
   generating sample images, by an ISP simulator emulating the ISP processing the sample data based on each of the plurality of different sample sets;
   evaluating each of the sample images, by an evaluation framework, to generate a plurality of sample score sets, each of the plurality of sample score sets including at least two sample scores;
   training a machine learning model using each of the plurality of different sample sets as an input and adjusting weights for hidden layers of the machine learning model by comparing an output of the machine learning model and the at least two sample scores included in each of the plurality of sample score sets;
   setting initial values for parameters for the ISP and initial weights for the parameters for the ISP;
   applying the initial weights to the initial values to generate weighted initial values for the parameters;
   inputting the weighted initial values to the trained machine learning model;
   adjusting the initial weights by comparing outputs of the trained machine learning model and predetermined reference scores;
   generating optimized parameters for the ISP based on the adjusted initial weights.

2. The method of claim 1, wherein the at least two sample scores include scores for at least two of resolution, texture loss, sharpness, noise, a dynamic range, shading, and a color for each of the sample images.

3. The method of claim 1, wherein the predetermined reference scores are adjusted by a user of a system including the ISP.

4. The method of claim 1, wherein the initial values are generated at random.

5. The method of claim 1, wherein the initial weights are adjusted until a difference between the predetermined reference scores and the outputs of the trained machine learning model is equal to or less than a reference difference.

6. The method of claim 1, wherein the initial weights are adjusted for a predetermined number of times.

7. The method of claim 1, wherein the optimized parameters are generated by applying the adjusted initial weights to the initial values.

8. An electronic system, comprising:
a simulator including a parameter generator to receive a sample data and generate a plurality of different sample sets and an image signal processor (ISP) simulator to generate sample images based on the plurality of different sample sets, each of the plurality of different sample sets including sample values for a plurality of parameters of the ISP simulator;
an evaluation framework configured to generate a plurality of sample score sets for the sample images;
a machine learning model trainer configured to train a machine learning model by using each of the plurality of different sample sets as an input and adjusting weights included in hidden layers of the machine learning model by comparing an output of the machine learning model and the plurality of sample score sets; and
an ISP parameter adjusting module configured to generate weighted initial parameters by applying initial weights to initial values for parameters of an ISP which is emulated by the ISP simulator, output the weighted initial parameters to the trained machine learning model,
wherein the ISP parameter adjusting module adjusts the initial weights based on a result of comparing outputs of the trained machine learning model and predetermined reference scores, and optimizes the parameters of the ISP based on the adjusted initial weights.

9. The electronic system of claim 8, wherein each of the plurality of sample score sets includes at least two sample scores, and the at least two sample scores include scores for at least two of resolution, texture loss, sharpness, noise, a dynamic range, shading, and a color for each of the sample images.

10. The electronic system of claim 8, wherein the ISP parameter adjusting module changes the parameters of the ISP, by adjusting the initial weights by referring to feedback from a user of the electronic system.

11. The electronic system of claim 10, wherein the predetermined reference scores are adjusted by the user.

12. The electronic system of claim 8, wherein the ISP parameter adjusting module adjusts the initial weights for a predetermined number of times.

13. The electronic system of claim 8, wherein the ISP parameter adjusting module adjusts the initial weights until a difference between the predetermined reference scores and the output of the trained machine learning model is equal to or less than a reference difference.

14. The electronic system of claim 8, further comprising a feedback module that compares the outputs of the trained machine learning model and the predetermined reference scores and transmits the result of comparing.

15. The electronic system of claim 8, further comprising the ISP.

16. The electronic system of claim 15, wherein a result image generated by the ISP is changed by adjusting the initial weights applied to the initial values for the parameters of the ISP.

17. The electronic system of claim 8, wherein the ISP parameter adjusting module adjusts the initial weights applied to the initial values for the parameters of the ISP, and does not adjust the initial values for the parameters of the ISP.

* * * * *